UNITED STATES PATENT OFFICE.

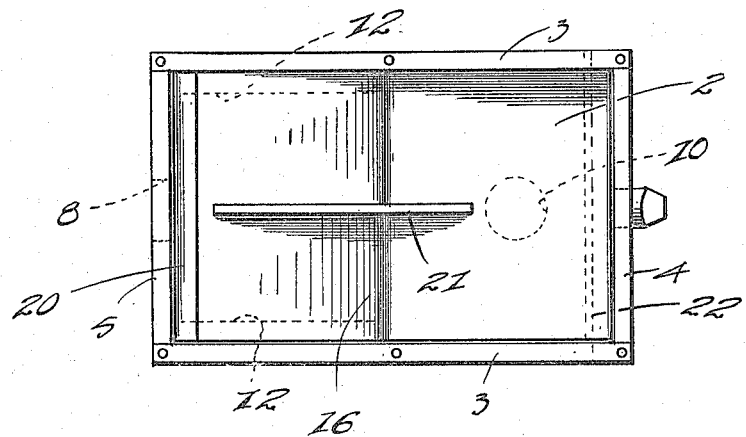
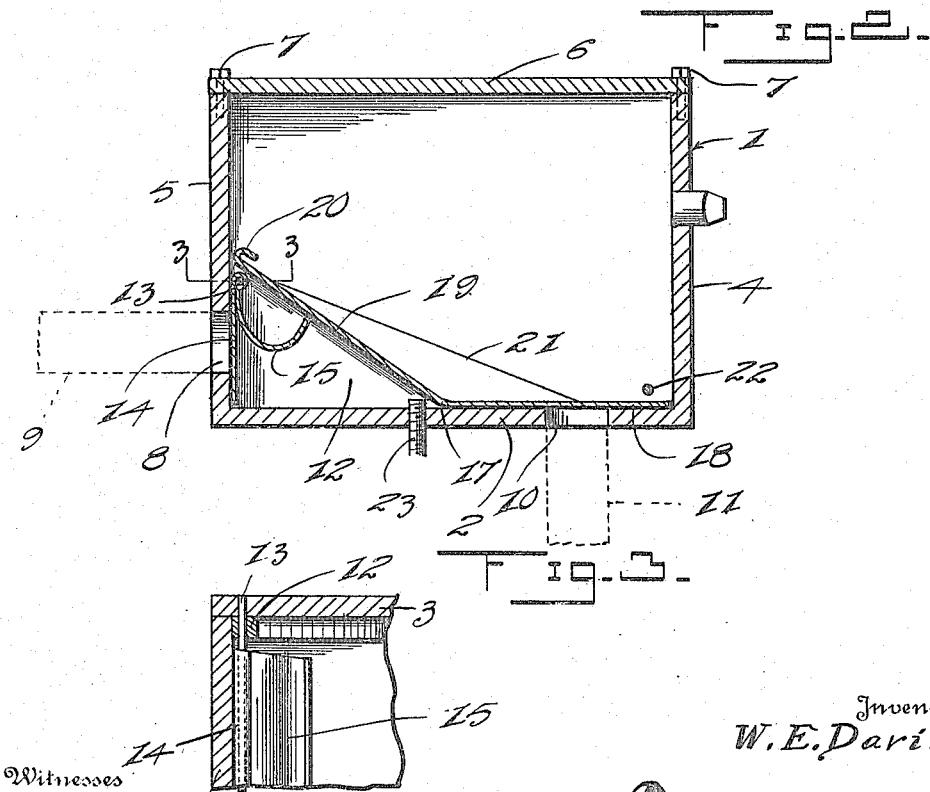

WILLIAM EDDY DAVIS, OF KIEFER, OKLAHOMA.

PIPE-LINE TRAP.

1,208,509.

Specification of Letters Patent.     Patented Dec. 12, 1916.

Application filed February 5, 1916.   Serial No. 76,444.

*To all whom it may concern:*

Be it known that I, WILLIAM E. DAVIS, a citizen of the United States, residing at Kiefer, in the county of Creek and State of Oklahoma, have invented certain new and useful Improvements in Pipe-Line Traps; and I do hereby declare the following to be a full, clear, and exact description of the invention, such as will enable others skilled in the art to which it appertains to make and use the same.

This invention relates to pipe line traps and more particularly to a device capable of being attached within the drain line pipe of a tank for the purpose of automatically closing the pipe when the tank has become empty and which will prevent air from entering the pipe line by way of the tank.

An object of this invention is to provide a casing, having an inlet port and an outlet port to receive a pipe line and having hinged within the casing a gate for closing the inlet port when liquid contained in the tank has entirely drained therefrom and further have a valve for closing the outlet pipe when the gate is in a closed position to prevent air from entering the pipe line.

Another and more specific object of this invention is to provide the gate with an extension to engage the valve and raise it from a seated position when the gate is in an open position to allow the liquid to pass freely through and out of the casing and further allow the valve to return by gravity to its seated position when the gate is in a closed position.

A still further object of this invention is the provision of a device of this character described, which is of few parts and can be easily and quickly manufactured and sold at a comparatively low cost, wherein it is described, claimed and illustrated in the accompanying drawing in which:—

Figure 1 is a top plan view of a pipe line trap constructed in accordance with my invention having the cover removed therefrom, Fig. 2 is a longitudinal sectional view, illustrating the gate and valve occupying a closed position, and Fig. 3 is a detail sectional view taken on the line 3—3 of Fig. 2.

Referring in detail to the drawing, 1 indicates a casing in entirety consisting of a bottom 2, having side walls 3 and end walls 4 and 5 formed thereon. The casing 1 is closed by a cover 6 and held thereto by bolts 7, whereby said cover 6 may be removed to assemble the various parts within the casing and provides means for cleaning foreign matter therefrom which accumulates during continuous usage, which will be hereinafter more fully described.

The end wall 5 is provided with an inlet opening 8 to receive a pipe 9, which leads to a tank or other source of supply (not shown). The bottom 2 is provided with an outlet port 10 to receive a pipe 11 which communicates with the pipe line (not shown), thus providing means of allowing the liquid of a tank or other source of supply to pass through the casing 1.

Secured to the side walls 3 are substantially triangular shaped braces 12 which abut the end wall 5. The braces 12 are each provided with a recess to receive a transversely extending shaft 13 that is journaled in the side walls 3 and at a point above and adjacent the inlet port 8. A gate 14 is bent around the shaft 13 intermediate its length and provided with one of its ends extending downwardly and terminating at a point adjacent the bottom 2 to close the inlet port 8. The other end of the gate 14 is bent downwardly and upwardly to provide an extension 15 which engages a portion of a valve 16. The valve 16 is of elongated formation and bent intermediate its ends as illustrated at 17 to provide a horizontal portion 18 which overlies the outlet port 10 and an upwardly inclined portion 19 that rests upon the extension 15. The free end of the portion 19 of the valve 16 is bent to form a hook 20 to receive any suitable tool for lifting the valve 16 from the casing 1. A rib 21 is secured centrally of the valve 16 and extends longitudinally thereof to reinforce the valve 16 at its bent portion 17. The transverse rod 22 is secured to the side walls 3 at a point adjacent the end of the horizontal portion 18 of the valve 16 to prevent the end of the horizontal portion 18 from raising beyond a given point. An adjusting bolt 23 is mounted in the bottom 2 for engagement with the upwardly inclined portion of the valve 16, providing means whereby the valve may be raised if it becomes stuck or wedged and refuses to rise under the influence of the gate 14. The valve being sometimes held in a seated position by a vacuum created within the outlet pipe, it then may be raised by turning the adjusting bolt 23 to allow air to enter the outlet pipe and overcome the vacuum therein.

In operation the liquid from a tank (not shown) passes through the pipe 9 into the casing 1 by the inlet port 8 and raising the gate 14 upwardly causes the extension 15 to push upwardly upon the valve 19 raising the horizontal portion 18 from an engagement with the outlet port 10 and allowing the liquid to pass outwardly to the pipe 11. When the supply of liquid has become exhausted the gate 14 will close the inner port 8 and allow the valve 16 to descend by gravity and close the outlet port 10, thus preventing air from entering the pipe line to which this device is a part.

While I have shown and described the preferred embodiment of my invention, it will be understood that minor changes in construction, combination and arrangement of parts may be made without departing from the spirit and scope of the invention as claimed.

Having thus described my invention, what I claim is:—

1. A pipe line trap comprising a casing, said casing provided with an inlet and an outlet port, a transverse shaft journaled within said casing, a gate bent intermediate its ends and into engagement with said shaft and provided with one of its ends extending downwardly over the inlet port, the outer end of said gate bent downwardly and upwardly to form an extension, a valve loosely mounted within said casing and adapted to overlie and close the outlet port, said valve adapted to engage the extension and be raised from engagement with the outlet port when the gate is moved to open position, and means for unseating said valve.

2. A pipe line trap comprising a casing, said casing provided with an inlet and an outlet port, a pair of substantially triangular shaped braces secured within said casing and provided with their highest points recessed, a shaft journaled within said recesses and extending through the side of the casing, a gate hingedly secured to said shaft and adapted to close the inlet port, a downwardly and upwardly directed extension formed on said gate, a valve bent intermediate its ends to provide a horizontal portion adapted to overlie the outlet port and an upwardly inclined portion adapted to rest upon the extension to be raised upwardly when the gate is in open position causing the horizontal portion to move away from engagement with the outlet port, and means for unseating the valve.

3. A pipe line trap comprising bottom, side and end walls, a cover detachably secured to the side and end walls, one of said end walls provided with an inlet port, said bottom wall provided with an outlet port, a pair of substantially triangular shaped braces secured to the side walls and abutting one of the end walls, a transverse shaft journaled upon said braces and extended into the side walls, a gate hingedly secured to the transverse shaft and adapted to close the inlet port, a valve bent intermediate its ends to provide a horizontal portion and an upwardly inclined portion, said horizontal portion adapted to overlie the outlet port, and a downwardly and upwardly curved extension formed on the upper end of said gate and adapted to engage the upwardly inclined portion to raise the horizontal portion from engagement with the outlet port.

4. A pipe line trap comprising a casing, said casing provided with an outlet and an inlet port, a transverse shaft journaled in said casing, a gate hingedly secured to said shaft and adapted to close said inlet port, a valve bent intermediate its ends to provide a horizontal portion and an upwardly inclined portion, said horizontal portion adapted to overlie the outlet port, and a downwardly curved extension formed on the upper end of said gate to engage and raise the upwardly inclined portion of the valve to move the horizontal portion away from an engagement with the outlet port when said gate is in open position, a transverse rod secured within said casing at a point adjacent the ends of the horizontal portion of said valve to limit the upward movement of the horizontal portion, and a setscrew mounted in the bottom to unseat the valve when held against movement.

In testimony whereof I affix my signature in presence of two witnesses.

WILLIAM EDDY DAVIS.

Witnesses:
ALVA CANGER,
BERT CAMPBELL.

Copies of this patent may be obtained for five cents each, by addressing the "Commissioner of Patents, Washington, D. C."